Feb. 25, 1936.　　　A. J. LOEPSINGER　　　2,031,660
METHOD OF SEALING CHARGED GLASS BULBS
Filed Nov. 26, 1932
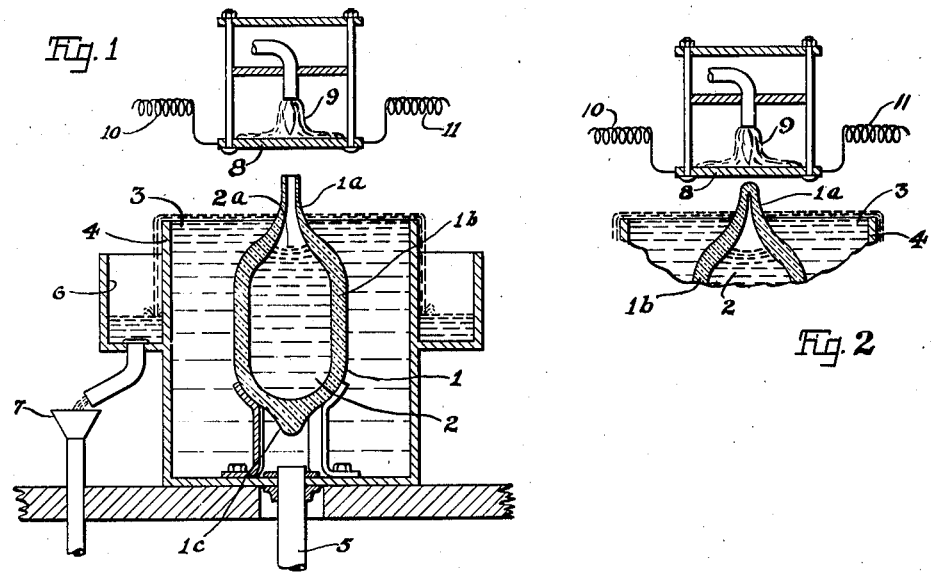
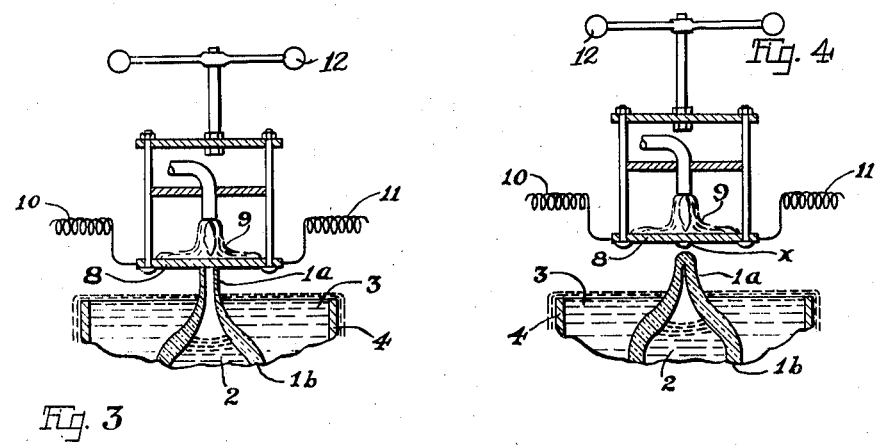
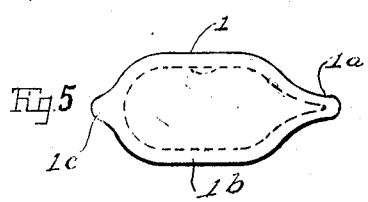
ALBERT J. LOEPSINGER
INVENTOR.
BY *Harry Dexter Peck*
ATTORNEY.

Patented Feb. 25, 1936

2,031,660

UNITED STATES PATENT OFFICE 2,031,660

METHOD OF SEALING CHARGED GLASS BULBS

Albert J. Loepsinger, Providence, R. I., assignor to General Fire Extinguisher Company, Providence, R. I., a corporation of Delaware Application November 26, 1932, Serial No. 644,454

4 Claims. (Cl. 49—77)

This invention relates to improvements in charged glass bulbs and methods of producing the same.

In the manufacture of articles from glass it has long been recognized that the article as a whole should be subjected to careful heat treatment in order to avoid internal strains which would render the material unsafe for use. The practice has been to provide in some way for the annealing of the entire article to the end that no residual strains will remain. Two significant temperatures are involved in such annealing process, the first or upper one being called the annealing temperature and the second or lower one being known as the strain temperature. These temperatures are different for different kinds of glass but they may be generally defined by saying that the annealing temperature is that at which the glass attains a degree of plasticity at which strain can not exist and the strain temperature is that temperature below which the glass can be cooled rapidly without producing permanent strain. It is to be noted, however, that too rapid cooling (or heating) below the strain temperature, such that uneven expansion or contraction of the glass occurs, will set up transitory strains severe enough to cause immediate fracture of the material. Accordingly it has been the practice to avoid this too rapid change of temperature and the occurrence of transitory unsafe strains in order that there will be no immediate fractures or cracking of the glass, but such practice has involved no attempt to anneal the glass or to prevent the formation of residual or permanent unsafe strains which might not cause fracture until after a long period of time, as for example, the ultimate result of fatigue.

In the annealing process it is important to effect the cooling of the material from its annealing temperature to its strain temperature at a relatively slow rate, inasmuch as the presence or absence of permanent strain depends upon the rate of temperature drop between these two points. If it be sufficiently slow there will be no appreciable strain. Since the interval between the annealing and strain temperatures is not large (for example the annealing temperature of Pyrex glass is 1022° F. while its strain temperature is 940° F. a difference of only 82°) the control of the temperature drop is not easily effected unless the article can be placed in a furnace provided with suitable temperature regulating devices. In many cases this is not possible, indeed in some instances it is prohibitive as where the glass article is in the form of a container holding a substance whose characteristics forbid heating to anywhere near even the strain temperature of the glass.

A container of this sort is the charged frangible bulb now being extensively used as the thermally responsive element of an automatic sprinkler. These bulbs contain fluid adapted upon rise of temperature to a relatively low degree, 135° F. for instance, to effect a complete destruction of the bulb. Obviously it is impossible to anneal such a charged bulb, as a whole, after it has been sealed. And heretofore, during the sealing of the bulbs, permanent strains have been set up in the glass as to render the bulbs unreliable for use in automatic sprinklers. These strains have resulted from the necessity of immersing the greater part of the charged bulb in a cooling medium, such as ice, with only the snout or tubulated portion exposed for contact with the sealing heat that is ordinarily provided by an oxyhydrogen blow torch. This method of sealing results in a section near the body end of the tubulated portion having permanent strains far in excess of those considered safe and good practice for an article made of glass. On this account bulbs have heretofore been made of quartz, as disclosed in my United States Letters Patent Re. 16,132. Quartz is an ideal material for this purpose because its coefficient of expansion is so small that in spite of the steep temperature gradient existing between the snout and body portions at the time of sealing, dangerous strains are not set up. But the high cost of quartz is a distinct commercial disadvantage and it has long been desired to use glass instead.

It is an object of the present invention to produce a charged glass bulb with no unsafe strains in the frangible material. Unsafe strains are different in different kinds of glass, depending in part upon the strength of the glass. For example, with glass having a tensile strength of approximately ten thousand pounds per square inch any strain in excess of four hundred pounds per square inch would be deemed an unsafe strain. Similarly in any glass having a coefficient of expansion of about one-quarter that of ordinary commercial glass, any strain in excess of about four hundred pounds per square inch would also be deemed an unsafe strain. In short, the invention contemplates the sealing and annealing of the tubulated portion of a glass bulb in such a manner that the strains produced in the glass are scarcely more than those produced in quartz and entirely within the limits of safety. The desired results are attained by providing for the close control of the heat conditions between the annealing and strain temperatures and, indeed, as far below the latter as may be desired.

In the accompanying drawing:

Figure 1 is an elevation in section showing somewhat diagrammatically means for practicing the improved method;

Figure 2 is a similar view showing the relation of parts at the time of sealing;

Figure 3 is another similar view showing how a different relation of parts may exist at the time of sealing;

Figure 4 is a view like Figure 3 showing the relation of parts after the sealing has been effected; and Fig. 5 is a view of the finished bulb.

Referring more particularly to the drawing the bulb 1 shown for purposes of illustration is intended to be employed as the heat responsive element of an automatic sprinkler. Such a bulb is charged with a suitable fluid 2 which upon being heated to a predetermined degree effects the complete destruction of the bulb. The operating temperature of sprinklers employing such bulbs may be as low as 135° F.

In preparing the bulb a tube of glass of the desired diametric proportions is heated at an annular zone until the material becomes sufficiently plastic to enable the portion of the tube to be drawn away on one side of the zone from the portion on the other side. This causes the tube wall to converge as it becomes attenuated, thus forming a neck which on cooling can be broken off leaving an open ended snout or tubulated portion 1a. The tube is again heated at a proper distance from the neck to give a body portion of desired size and when this portion is drawn away from the remainder of the tube, and the attenuated neck broken, the bottom end 1c of the bulb is either then closed or may be easily closed by a slight further heating. The bulb may then be annealed as any other ordinary glass article, thus freeing it of any appreciable internal strains.

The empty bulb is subsequently filled with the bursting charge 2 to a point indicated by the represented meniscus 2a of the fluid, the charge being suitably introduced through the open tubulated portion 1a. The problem now presented is the sealing of this portion without disturbance of the charge and without setting up in the glass internal strains in excess of what is deemed safe in such material. The protection of the volatile charge is readily accomplished by immersing the bulb in a heat absorbing medium. It may be set in water 3 in a suitable container 4 and the water then frozen, or, as herein shown, water may be fed into the bottom of the container through a pipe 5 and allowed to overflow around the upper edge into the annular trough 6, from whence it may pass to waste through a drain 7. In either case, the ice or the flowing water will act as a heat absorber and thus prevent the charge of the bulb from reaching the degree of temperature at which it would vaporize and generate pressure in the bulb. With the bulb thus protected heat may be applied to the snout or tubulated portion 1a to effect its sealing. Under particularly favorable conditions, and with the exercise of extreme care, the desired result may be approximated by the use of a flame under perfect control, but I much prefer to use one of the two methods now to be described.

In one method the heat necessary to seal the bulb is applied solely by radiation. With the bulb positioned as shown in Figure 1, with its bursting charge suitably protected, a plate 8, which may be either of a metallic or a ceramic nature, is moved toward the extended tubular portion 1a. This plate is highly heated, either by a flame 9 playing on its surface remote from the glass and/or by an electric current passing through it and the wires 10, 11. The heated plate is brought very close to the upper end of the tubulated portion whereupon the glass is heated by radiation and finally closed as seen in Figure 2.

Since the intensity of radiated heat varies inversely as the square of the distance from the radiating source, there is a very steep gradient of temperature between that of the plate and the glass below the level of the water surface. Somewhere in this range of temperature there is a zone of glass which is below the strain temperature and hence not subject to strains. But there is another zone at temperatures between the strain and annealing temperatures, and still another zone at temperatures above the annealing temperature, in both of which zones permanent internal strains may be developed in the glass if these zones should cool rapidly. Accordingly the improved method obviates this dangerous rapid cooling by a relatively slow withdrawal of the heated plate away from the bulb after sealing has been effected. Of course, the intensity of the radiant heat can also be reduced by decreasing the intensity of the gas flame or the electric current or both, but I find in practice that the desired result is more easily and uniformly attained by slow withdrawal of the radiating element from the bulb. In either case the temperature drop is reliably controlled and the cooling of the glass is effected at a rate less than that at which permanent unsafe strains in the material can occur.

The foregoing method is especially satisfactory when used with glass having a low softening point but is somewhat slow when it is desired to treat glass having a high softening point and good thermal resistance. For such material I prefer to follow the method illustrated in Figures 3 and 4. The means employed may be identical and indeed the process is the same except that the radiating plate is brought into actual contact with the glass as shown in Figure 3. In this manner the glass receives heat both by conduction and radiation and thus the time of heating up is somewhat shorter than if radiation alone were depended upon. After the glass has been softened the heated plate is withdrawn as before described, carrying with it a minute portion $x$ of the glass and effecting a seal as seen in Figure 4. It is to be understood that the withdrawal of the plate is ordinarily at such a slow rate that a long thread is not formed between the minute portion of the glass adhering to the plate and the end of the tubulated portion.

If desired, during the process of sealing, a vibratory motion of small amplitude may be imparted by the handle 12, or other suitable means, to the heated plate, either of an up and down linear nature or a rotary nature. This would serve to puddle the glass and assist in welding the material to produce a good seal.

While I have particularly described the heated plate as being movable, it is obvious that the heated element may be fixed and the glass article be movable toward and from it, indeed both the said element and the article might be movable. Accordingly in the claims which follow the terms defining movement shall be understood as mean-

I claim:

1. The method of heat treating a charged glass bulb having a tubulated portion which consists in bringing a heated element into contact with the said portion and thereby raising it above the strain temperature, imparting a vibratory motion to the element to effect puddling of the glass and then separating the element from the portion followed by a slow withdrawal of the element away from the portion to effect the cooling of the latter at a rate less than that at which unsafe strains in the glass can occur.

2. The method of sealing a bulb of frangible material having a body, nearly filled with a fluid charge capable when the bulb is sealed of bursting it at a predetermined temperature, and having an open tubulated portion with the end to be sealed in close proximity to said charge; which method comprises maintaining the body and its charge below said predetermined temperature while continuously applying heat to the tubulated portion to bring it to the fusion temperature and thereby effect its sealing; followed by the said continuous application of heat at gradually reduced temperatures until the temperature of the material is below the strain temperature thereof thereby to effect annealing of the tubulated portion.

3. The method of sealing a glass bulb having a body, nearly filled with a fluid charge capable when the bulb is sealed of bursting it at a predetermined temperature, and having an open tubulated portion with the end to be sealed in close proximity to said charge; which method comprises maintaining the body and its charge below said predetermined temperature while effecting the sealing and annealing of the tubulated portion during a continuous application of heat thereto; the said continuous application of heat being such as to bring the tubulated portion to a fusion temperature and thereby effect its sealing, followed by a slow gradual reduction of the heat from said fusion temperature to below the strain temperature to thereby effect the annealing of said tubulated portion.

4. The method of sealing a glass bulb having a body, nearly filled with a fluid charge capable when the bulb is sealed of bursting it at a predetermined temperature, and an open tubulated portion with the end to be sealed in close proximity to said charge; which method comprises maintaining the body and its charge below said predetermined temperature while bringing a continuously heated element into contact with the said end of the tubulated portion to thereby heat the said portion to the fusion temperature and effect its sealing; followed by slow gradual separation of the continuously heated element from the sealed portion to effect a slow gradual reduction of the temperature of said portion from the fusion temperature to below the strain temperature to thereby effect the annealing of said portion.

ALBERT J. LOEPSINGER.